(12) United States Patent
Li et al.

(10) Patent No.: US 8,697,828 B2
(45) Date of Patent: Apr. 15, 2014

(54) HYDROSILICONE RESIN AND PREPARATION PROCESS THEREOF

(71) Applicants: Henkel China Co. Ltd., Shanghai (CN); Henkel AG & Co. KGAA, Duesseldorf (DE)

(72) Inventors: Zhiming Li, Shanghai (CN); Wentao Xing, Shanghai (CN); Wenjuan Tan, Shanghai (CN); Liwei Zhang, Shanghai (CN); Yong Zhang, Shanghai (CN); Thomas Plantenberg, Leverkusen (DE); Leticia Borque, Duesseldorf (DE)

(73) Assignee: Henkel AG & Co. KGAA, Duesseldorf (DE)

(*) Notice: Subject to any disclaimer, the term of this patent is extended or adjusted under 35 U.S.C. 154(b) by 0 days.

(21) Appl. No.: 13/803,538

(22) Filed: Mar. 14, 2013

(65) Prior Publication Data

US 2013/0197254 A1    Aug. 1, 2013

Related U.S. Application Data

(63) Continuation of application No. PCT/CN2010/078329, filed on Nov. 2, 2010.

(51) Int. Cl.
| | | |
|---|---|---|
| *C08G 77/00* | (2006.01) | |
| *C08G 77/04* | (2006.01) | |
| *C08G 77/06* | (2006.01) | |
| *C08G 77/12* | (2006.01) | |

(52) U.S. Cl.
    USPC ................................. 528/10; 528/12; 528/31

(58) Field of Classification Search
    None
    See application file for complete search history.

(56) References Cited

U.S. PATENT DOCUMENTS

| | | | |
|---|---|---|---|
| 4,262,107 A | 4/1981 | Eckberg | |
| 4,461,851 A * | 7/1984 | Hashimoto | 521/110 |
| 4,801,622 A * | 1/1989 | Inoue et al. | 521/134 |
| 5,238,967 A * | 8/1993 | Okawa et al. | 521/77 |
| 5,519,067 A * | 5/1996 | Yaginuma et al. | 521/154 |
| 5,527,873 A * | 6/1996 | Kobayashi et al. | 528/23 |
| 5,861,448 A * | 1/1999 | Griffith et al. | 523/213 |
| 5,886,060 A * | 3/1999 | Minasyan et al. | 521/91 |
| 6,512,071 B1 | 1/2003 | Hacker et al. | |
| 6,518,371 B1 | 2/2003 | Fink et al. | |
| 7,425,351 B2 * | 9/2008 | Chevalier et al. | 427/379 |
| 7,737,194 B2 | 6/2010 | Kashiwagi et al. | |
| 7,767,754 B2 * | 8/2010 | Zhu et al. | 524/588 |
| 8,420,748 B2 | 4/2013 | Henning et al. | |
| 8,455,562 B2 * | 6/2013 | Maliverney | 521/129 |
| 2003/0228473 A1 * | 12/2003 | Benayoun et al. | 428/447 |
| 2006/0081864 A1 | 4/2006 | Nakazawa | |
| 2007/0027286 A1 * | 2/2007 | Blanc-Magnard et al. | 528/31 |
| 2007/0207176 A1 | 9/2007 | Kamei et al. | |
| 2010/0188766 A1 * | 7/2010 | Harimoto et al. | 359/894 |
| 2011/0098420 A1 | 4/2011 | Takizawa et al. | |

* cited by examiner

*Primary Examiner* — Robert S Loewe
(74) *Attorney, Agent, or Firm* — Steven C. Bauman

(57) ABSTRACT

The present invention relates to a liquid hydrosilicone resin and a preparation process thereof. The average composition of the liquid hydrosilicone resin is represented by the following formula:

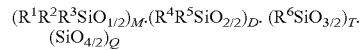

wherein $R^1$ to $R^6$ are identical or different radicals independently selected from the group consisting of organic groups and a hydrogen atom, with the proviso that at least one of $R^1$ to $R^6$ is a hydrogen atom bonded directly to a silicon atom.

The liquid hydrosilicone resin is obtained by dispersing a hydrosilicone oil, a hydroxyl silicone resin and a dehydrogenation catalyst in a solvent to form a dispersion, allowing the dispersion to react, and then removing the solvent and the catalyst.

20 Claims, No Drawings

HYDROSILICONE RESIN AND PREPARATION PROCESS THEREOF

FIELD OF THE INVENTION

The present invention relates to a hydrosilicone resin and more particularly to a liquid hydrosilicone resin with high molecular weight. The present invention also relates to a preparation process for producing the resin and numerous uses of the resin.

BACKGROUND OF THE INVENTION

Silicone resin is a kind of polyorganosiloxanes with a crosslinked structure. Typically, the preparation of silicone resins starts from organosilanes, and by hydrolytic condensation of the organosilanes and then rearrangement, silicone resins having reactive groups, such as hydroxyl, hydrogen atom, alkoxy and vinyl, directly bonded to the silicon atom may be prepared. Silicone resins have excellent properties such as heat and weathering resistance, good electronic insulation, chemical resistance, hydrophobicity and flame retardancy. Moreover, other properties are also obtainable by modification. Therefore, they can be widely used in the field of insulating protective coating materials, heat/weathering resistant and anti-corrosion coating materials, metal protective coating materials, construction engineering water/humidity-proof coating materials, optical coating materials, mold releasing agents, adhesives, semiconductor encapsulating materials and electronic element package materials.

BRIEF SUMMARY OF THE INVENTION

Hydrosilicone resins may be crosslinked through various reactions such as addition, condensation etc. due to the highly reactive Si—H bond. Hydrosilicone resins may be functionalized by hydrosilylation in a wide range of conditions so that various functionalized silicone resins can be provided. In addition, compared with hydroxyl silicone resins, hydrosilicone resins may be stored per se at ambient temperature.

DETAILED DESCRIPTION OF THE INVENTION

Currently, the preparation processes for hydrosilicone resins are typically based on the cohydrolysis-condensation of silanes.

U.S. 20060081864A1, in the name of Wacker Chemie GmbH, disclosed that a hydrosilicone resin can be obtained by following steps: reacting a Si-OH-containing chlorosilane, an alkylchlorosilane, H$_2$O and sulfuric acid to equilibration at low temperature; and then adding toluene/water into the mixture to neutralize through layer separation; and removing the solvent by distillation under reduced pressure.

CN 101295032A, in the name of ShinEtsu Chemical Co. Ltd., disclosed that a hydrosilicone resin can be prepared by dissolving phenylchlorosilane, a linear silicone oil terminated by Si—Cl group and a Si—H-containing chlorosilane into toluene and dropwise adding the resultant solution into water to facilitate the cohydrolysis-condensation reaction, washing with water, neutralizing the mixture with basic washing and then removing water and the solvent.

CN 98806411.1, in the name of Allied Signal Inc., disclosed a process wherein an organo-hydrogenated siloxane resin can be obtained by using a two-phase solvent system (a mixture of nonpolar solvent, polar solvent and water) and a solid catalyst to facilitate the cohydrolysis-condensation of a hydrogenated trihalosilane monomer and an organotrihalosilane. A pure organohydrogenated siloxane resin can be obtained after filtering the solid catalyst and evaporating the solvent.

However, the above-mentioned preparation methods for hydrosilicone resins in the prior art encounter several technical problems, such as:

1) the reaction conditions are difficult to control, i.e., the addition of the starting materials, e.g. water and the catalysts, is required to be carefully controlled to prevent from gelling; the processing parameters. (reaction temperature, duration, stirring rate, etc) are also required to be carefully controlled;
2) the process is complicated since it includes steps of hydrolysis, condensation, neutralization of catalyst, solvent removing etc.;
3) considerable byproducts, e.g. acids and alcohols would emerge during the preparation of resins, and thus the process demands a strict standard for equipments and renders complicated purification procedures necessary;
4) hydrosilicone resins with high molecular weight are difficult to produce. Generally speaking, silicone resins with high molecular weight could only be obtained in the presence of catalysts like acid, base, etc. for a long reaction time because Si—H groups seldom exist during the condensation of the resins and are prone to induce severe side reactions and even crosslinking. Therefore, the synthesis methods of hydrosilicone resins having high molecular weight are quite limited;
5) hydrosilicone resins with high light transmittance are hard to produce, too. Since the side reactions, particularly the gelling reaction, will result in the decrease of the light transmittance of the hydrosilicone resin products during the preparation of the hydrosilicone resins, their application is restricted;
6) the reproducibility is poor. Due to the different factors that may influence the reaction, the product performances in different batches are hardly to be predicted.

Therefore, it is of important industrial significance to provide a novel process that is economical and easy for producing hydrosilicone resins. Thus, the object of the present invention is to provide a hydrosilicone resin exhibiting high molecular weight and high light transmittance and furthermore to provide a preparation process which allows an easy access to such resins.

After intense and wide study, the inventors found a novel preparation process for producing hydrosilicone resins, which at least partially overcomes the above-mentioned problems of the prior art and also surprisingly found that a novel liquid hydrosilicone resin of a high weight-average molecular weight with excellent properties including high molecular weight, adjustable viscosity, high light transmittance and/or adjustable reactive hydrogen content—by which the content of hydrogen atoms directly bonded to Si-atoms is meant—is obtained by said process.

One aspect of the invention relates to a liquid hydrosilicone resin, which has an average compositional formula (I):

$(R^1R^2R^3SiO_{1/2})_{M'}(R^4R^6SiO_{2/2})_{D'}(R^6SiO_{3/2})_{T'}(SiO_{4/2})_Q$ 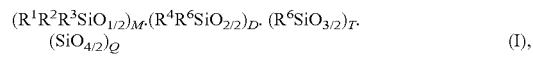 (I), wherein $R^1$ to $R^6$ are identical or different radicals independently selected from the group consisting of organic groups and a hydrogen atom, with the proviso that at least one of $R^1$ to $R^6$ is a hydrogen atom bonded directly to a silicon atom, and M, T, and Q each represent a number ranging from 0 to less than 1, D represents a number larger than 0 and less than 1, M+D+T+Q=1, and T+Q>0;

and has an average of at least two hydrogen atoms bonded directly to a silicon atom per molecule and a weight-average molecular weight of 10,000-300,000 g/mol.

Another aspect of the invention relates to a preparation process for the liquid hydrosilicone resin of the present invention, which involves the dehydrogenation of hydrosilicone oil and hydroxyl silicone resin. Although the dehydrogenation reaction of hydrosilicone oil and hydroxyl silicone resin has been mentioned in the prior art, the reaction is generally used for crosslinking and foaming in the prior art since said reaction is difficult to control. After intensive and wide study, the inventors found that a moderate and controllable dehydrogenation can be achieved by selecting suitable starting materials, and thus hydrosilicone resins with outstanding performance can be produced from suitable hydrosilicone oil and hydroxyl silicone resin in the present invention.

Said preparation process for the liquid hydrosilicone resin of the present invention comprises the following steps: dispersing at least one hydrosilicone oil, at least one hydroxyl silicone resin and at least one dehydrogenation catalyst in a solvent to form a dispersion, allowing the dispersion to react, and then removing the solvent and the catalyst,
wherein the hydrosilicone oil comprises a linear hydrosilicone oil of the following formula (II) and/or a cyclic hydrosilicone oil of the following formula (III):

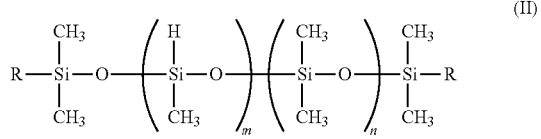
(II)

in which R is methyl or hydrogen, m>0, n≥0, the number of Si—H groups per molecule 3, and the content of hydrogen atoms directly bonded to Si-atoms is 0.1-1.6 wt % based on the total weight of the hydrosilicone oil,

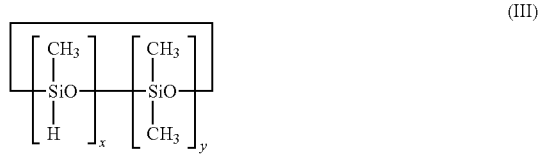
(III)

in which x>0, y≥0, the number of Si—H groups per molecule ≥3, and the content of hydrogen atoms directly bonded to Si-atoms is 0.1-1.6 wt % based on the total weight of the hydrosilicone oil;
the hydroxyl silicone resin has an average compositional formula (IV):

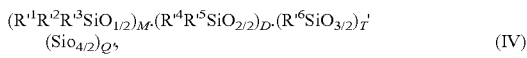
(IV)

in which $R'^1$ to $R'^6$ are identical or different radicals independently selected from the group consisting of organic groups and hydroxyl groups, and at least one of $R'^1$ to $R'^6$ is a hydroxyl group,
M', D', T' and Q' each represents a number ranging from 0 to less than 1,
M'+D'+T'+Q'=1, and T'+Q'>0, and
the number of Si—OH groups per molecule of the hydroxyl silicone resin≥3;
provided that the molar ratio of the Si-H groups in the hydrosilicone oil to the Si—OH groups in the hydroxyl silicone resin is from more than 1.0 to 100.0.

Preferably, in the above-mentioned process the molar ratio of the Si—H groups in the hydrosilicone oil to the Si—OH groups in the hydroxyl silicone resin is from 10.0 to 40.0.

Usually, in the hydrosilicone oil and in the hydroxyl silicone resin according to the present invention, one Si-atom will carry only one hydrogen atom or OH group, respectively. Nevertheless, should one Si-atom carry two hydrogen atoms or OH groups, respectively, each hydrogen atom or OH group, respectively, bonded to an Si-atom is counted as one separate Si—H group or Si—OH group with regard to the terms "number of Si—H groups", "number of Si—OH groups" and "molar ratio of the Si—H groups to the Si—OH groups".

Without being bound to any theory, it is believed that in the preparation process of this invention, the hydrosilicone oil provides Si-H groups that react with the hydroxyl groups of the hydroxyl silicone resin by dehydrogenation, and thus the hydrosilicone oil is linked to the hydroxyl silicone resin via chemical bonding to obtain the hydrosilicone resin. Since the preparation process of the hydrosilicone resin in this invention does not involve hydrolysis, condensation and/or rearrangement reactions that exist in the conventional cohydrolysis-condensation processes, the present process has few side reactions, simple processing and good repeatability.

Another aspect of the invention relates to a liquid hydrosilicone resin prepared according to the process of the invention.

Still another aspect of the invention relates to the use of the liquid hydrosilicone resin according to the present invention or of a liquid hydrosilicone resin produced according to the process of the present invention in fields of insulating protective coating materials, heat/weathering resistant anti-corruption coating materials, metal protective coating materials, construction engineering water/humidity-proof coating materials, optical coating materials, mold releasing agents, adhesives, semiconductor encapsulating materials and electronic element package materials.

The preparation process according to the present invention is simpler and more controllable compared with those in the prior art. The resultant liquid hydrosilicone resin of the invention has numerous advantages, including high molecular weight and high purity and light transmittance. Moreover, the viscosity of the instant liquid hydrosilicone resin is adjustable over a wide range, depending on the different applications of the resin. Also, the content of hydrogen of the resin of the instant invention can be varied depending on different requirement of applications.

Detailed preparation process and the hydrosilicone resin of the present invention are explicitly described below without limiting the present invention to the following contents.

Hydrosilicone Resin

The liquid hydrosilicone resin according to the present invention has an average compositional formula (I):

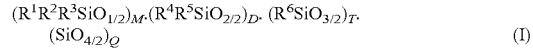
(I)

wherein $R^1$ to $R^6$ are identical or different radicals independently selected from the group consisting of organic groups and a hydrogen atom, with the proviso that at least one of $R^1$ to $R^6$ is a hydrogen atom bonded directly to a silicon atom, and
M, T, and Q each represents a number ranging from 0 to less than 1, D represents a number larger than 0 and less than 1, M+D+T+Q=1, and T+Q>0; and said resin has an average of at least two hydrogen atoms bonded directly to a silicon atom per molecule and a weight-average molecular weight of 10,000-300,000 g/mol.

The term "liquid" used for said liquid hydrosilicone resin in the sense of the invention should be understood in a broad manner, which includes, but is not limited to, that said resin may be in a liquid state at least at a certain temperature from room temperature to a moderately elevated temperature and at standard atmospheric pressure (101,325 Pa). Preferably, the hydrosilicone resin is in a liquid state at least at room temperature and standard atmospheric pressure. As used herein, the term "room temperature" refers to a certain temperature from 20° to 30° C.

A "silicone resin" according to the present invention is understood to be an organopolysiloxane having a branched structure. A "silicone oil" is understood to be an organopolysiloxane having a linear structure and being in a liquid state at least at room temperature.

An "organopolysiloxane" is understood to be a synthetic compound, in which silicon-atoms are linked via oxygen-atoms to form a chain or a three-dimensional network and wherein the remaining valencies at the silicon-atoms are saturated by any atoms or organic groups providing a substitution other than the aforementioned linkage to another silicon-atom via an oxygen-atom. In the context of the present invention, an organopolysiloxane is understood to exhibit at least ten units, wherein a "unit" is understood to be a structural moiety which is formed of 1 silicon-atom and—according to the number of valencies at the silicon-atom—its 4 linkages to oxygen-atoms and other atoms or organic groups, respectively. A "hydrosilicone resin" or "hydrosilicone oil" is understood to be an according organopolysiloxane exhibiting one or more Si-bonded hydrogen-atoms.

As used in the present invention, the terms "preferred" and "preferably" refer to embodiments of the invention that possess certain benefits under certain circumstances. Nevertheless, other embodiments may also be preferred under the same or other circumstances. Furthermore, the recitation of one or more preferred embodiments is not intended to exclude other embodiments from the scope of the invention.

In the above-mentioned average compositional formula (I), the organic groups for $R^1$ to $R^6$ are preferably selected from the group consisting of linear or branched alkyls having 1-20 carbon atoms, alkenyls having 2-20 carbon atoms, cycloalkyls having 5-25 carbon atoms, cycloalkenyls having 5-25 carbon atoms, aryls having 6-30 carbon atoms, arylalkyls having 7-30 carbon atoms, and halides of said alkyls, alkenyls, cycloalcyls, cycloalkenyls, aryls and arylalkyls.

The term "halides" used in the present invention refers to one or more halogen-substituted hydrocarbyl groups represented by $R^1$ to $R^6$. The term "halogen-substituted" refers to fluoro-, chloro-, bromo- or iodo- radicals.

Still more preferably, said organic groups are selected from the group consisting of linear or branched alkyls having 1-10 carbon atoms, alkenyls having 2-10 carbon atoms, cycloalkyls having 5-15 carbon atoms, cycloalkenyls having 5-15 carbon atoms, aryls having 6-15 carbon atoms, arylalkyls having 7-15 carbon atoms, and fluorides or chlorides thereof. Still particularly preferably, said organic groups are selected from the group consisting of alkyls having 1-3 carbon atoms and phenyl. Alkyls having 1-3 carbon atoms can be methyl, ethyl, n-propyl and i-propyl.

The weight-average molecular weight of the present liquid hydrosilicone resin is high and adjustable depending on different requirements of applications. Preferably, the weight-average molecular weight of the hydrosilicone resin is 10,000-250,000 g/mol. More preferably, the weight-average molecular weight of the hydrosilicone resin is 10,000-150,000 g/mol. According to the present invention, the weight-average molecular weight is determined by gel permeation chromatography (GPC) under the following conditions:

eluent: THF (tetrahydrofurane)
standard: Polystyrene
temperature: 35° C. (column and RI).
Further parameters are preferably:
flow-rate: 0.8 ml/min
detection: RI (refractive index)
columns: 3 Plgel mixed-D columns in series (Polymer laboratories, 7.5*300 mm)
sample preparation: 2.5 mg/ml in THF
injection volume: 100 µl.

Being a liquid hydrosilicone resin, there is no specific limitation on viscosity of the resin. The viscosity may be varied in a wide range depending on different required situations. A preferred viscosity of the hydrosilicone resin at 25° C. is not less than 100 mPa·s. According to the present invention, the viscosity is measured on a Brookfield DV-+Digital Viscometer/LV at a temperature of 25° C. (spindle S64, rotation speed 50 rpm).

The light transmittance of the liquid hydrosilicone resin is high and also adjustable. Preferably, the light transmittance of the hydrosilicone resin within the visible light range is not less than 80%, and said light transmittance is measured based on JY/T 022-1996 (1 cm quartz cell, bandwidth 2 nm, wavelength range: 400-800 nm). Still more preferably, said light transmittance of the hydrosilicone resin is not less than 90%.

Hydrosilicone Oil

The hydrosilicone oil used in the present invention comprises those selected from a linear hydrosilicone oil of the above mentioned formula (II) and/or a cyclic hydrosilicone oil of the above mentioned formula (III).

Preferably, the weight-average molecular weight of the above mentioned hydrosilicone oil is 500-20,000, and more preferably 1,000-17,000 g/mol (according to GPC measurement, see above).

Yet preferably, the viscosity of the above mentioned hydrosilicone oil is 5-1,000 mPa·s (25° C.), more preferably 10-600 mPa·s (25° C.).

The content of hydrogen atoms directly bonded to Si-atoms of the above mentioned hydrosilicone oil is 0.1-1.6 wt %, preferably 0.5-1.5 wt %, more preferably 1.0-1.5 wt % based on the total weight of the hydrosilicone oil. According to the present invention, the content of hydrogen atoms directly bonded to Si-atoms of the hydrosilicone oil is determined by reacting sodium hydroxide with the hydrosilicone oil, collecting the hydrogen thus generated and measuring its volume from which the content is calculated.

In one embodiment of the present invention, the content of the hydrosilicone oil is preferably 1.0-40.0 wt %, more preferably 3.0-40.0 wt %, based on the total weight of the dispersion.

Hydroxyl Silicone Resin

The term "hydroxyl silicone resin" refers to a silicone resin having Si—OH groups. In the present invention, the hydroxyl silicone resin is represented by the above mentioned formula (IV).

Preferably, the organic groups in the hydroxyl silicone resin are selected from the group consisting of linear or branched alkyls having 1-20 carbon atoms, alkenyls having 2-20 carbon atoms, cycloalkyls having 5-25 carbon atoms, cycloalkenyls having 5-25 carbon atoms, aryls having 6-30 carbon atoms, arylalkyls having 7-30 carbon atoms, and halides of said alkyls, alkenyls, cycloalkyls, ayeloalkenyls, arylalkyls and aryls.

Still more preferably, said organic groups are selected from the group consisting of linear or branched alkyls having 1-10 carbon atoms, alkenyls having 2-10 carbon atoms, cycloalkyls having 5-15 carbon atoms, cycloalkenyls having 5-15 carbon atoms, aryls having 6-15 carbon atoms, arylalkyls having 7-15 carbon atoms, and fluorides or chlorides thereof. Still particularly preferably, said organic groups are selected from the group consisting of alkyls having 1-3 carbon atoms and phenyl. Alkyls having 1-3 carbon atoms can be methyl, ethyl, n-propyl, i-propyl.

Preferably, the content of hydroxyl groups directly bonded to Si-atoms in the hydroxyl silicone resin is 0.1-20.0 wt %, and more preferably 1.0-10.0 wt % based on the weight of the hydroxyl silicone resin.

Yet still preferably, the weight-average molecular weight of the hydroxyl silicone resin is 600-250,000, and more preferably 1,500 to 100,000.

Preferably, the content of the hydroxyl silicone resins according to the process of the present invention is 1.0-40.0 wt %, and preferably 2.0-40.0 wt % based on the total weight of the dispersion.

Furthermore, the total content of the hydrosilicone oil and the hydroxyl silicone resin in the dispersion is preferably 2.0-60.0 wt % based on the total weight of the dispersion. More preferably, the total content of the hydrosilicone oil and the hydroxyl silicone resin in the dispersion may be 2.0-50.0 wt % based on the total weight of the dispersion.

In the preparation process of the present invention, the hydroxyl silicone resin may be selected from commercially available products, e.g. the silicone resins of TSR116, TSR117, TSR144, TSR145, TSR160 and TSR165 from Momentive Company; the silicone resins of KR400, KR220L, KR255, KR282 and KR212 from ShinEtsu Chemical Co.; the silicone resins of 805, 806A, 808, 217, 220, 233, 249 and Z-6018 from Dow Corning Company; and MQ OH-1, MQ OH-3, MQ OH-4 and MQ OH-5 from SiVance LLC Company.

Solvent

There is no specific limit on the selection of solvents in the process according to the invention as long as the solvent is suitable for the dehydrogenation reaction. The solvent in the process according to the present invention can for example be one or more selected from the group consisting of ester, ketone, aliphatic hydrocarbon, aliphatic cyclic hydrocarbon, aromatic hydrocarbon and ether, preferably one or more selected from acetone, butanone, methylisobutanone, cyclohexanone, toluene, xylene, methyl acetate, ethyl acetate, butyl acetate, diethyl ether, tetrachloromethane, petroleum ether and tetrahydrofuran.

In the process of the present invention, the total solvent content is preferably 15.0-97.9 wt %, and more preferably 30.0-90.0 wt % based on the total weight of the dispersion.

Catalyst

The catalyst in the process according to the present invention is that for the dehydrogenation of Si—H and Si—OH groups. Preferably, the catalyst can be readily removed as gas after the reaction is completed.

More preferably, the dehydrogenation catalyst is one or more selected from the group consisting of bis(dimethylaminoethyl) ether, dimethylcyclohexylamine, N-methyldicyclohexylamine, pentamethyldiethylenetriamine, pentamethyldipropylenetriamine, tetramethylethanediamine, tetramethylethylpropylamine, tetramethylhexanediamine, N-methylmorpholine, N-ethylmorpholine, 2,2-bis(morpholino)diethyl ether, cocomorpholine, N-methylimidazole, 1,2-dimethylimidazole, 1,4-dimethylpiperazidine, ammonia, ammonium carbonate, ammonium bicarbonate, N,N-dimethylbenzylamine, tri(dimethylaminopropyl)amine and triethylamine.

Preferably, the total content of the catalyst is 0.1-10.0 wt %, and more preferably 0.1-5.0 wt % based on the total weight of the dispersion.

All the reagents and materials used in the process according to the present invention can be commercially available.

There is no specific limitation on the reaction temperature and reaction time of the process. Preferably, the reaction temperature can be 20-100° C. and alternatively preferably, the reaction time can be 1-20 hours.

EXAMPLES

The present invention is further described by way of examples below without any intention that the scope of the present invention is limited to the examples.

The hydrosilicone oils used in the examples are:

TSF-484 from Momentive Company, the hydrogen content: 1.58 wt %, the weight-average molecular weight: 4,000-5,000, viscosity at 25° C.: 30 mPa·s;

7672 from Dow Corning Company, the hydrogen content: 0.9 wt %, the weight-average molecular weight: 11,000, viscosity at 25° C.: 70 mPa·s;

1107 from Dow Corning Company, the hydrogen content: 1.60 wt %, the weight-average molecular weight: 4,000, viscosity at 25° C.: 30 mPa·s;

7048 from Dow Corning Company, the hydrogen content: 1.58-1.60 wt %, the-weight average molecular weight: 4,000-5,000, viscosity at 25° C.: 30 mPa·s;

KF99 from ShinEtsu Chemical Co., the hydrogen content: 1.58-1.60 wt %, the weight-average molecular weight: 4,000-5,000, viscosity at 25° C.: 30 mPa·s;

202 methyl hydrosilicone oil from Bluestar Company, the hydrogen content: 1.58-1.60 wt %, the weight-average molecular weight: 1,700, viscosity at 25° C.: 25 mPa·s;

F1-3546 from Dow Corning, the hydrogen content: 0.11 wt %, the weight-average molecular weight: 8,700, viscosity at 25° C.: 135 mPa·s;

HMS-301 from Gelest Company, the hydrogen content: 0.40 wt %, The weight-average molecular weight: 1,900-2,000, viscosity at 25° C.: 25-35 mPa·s.

In the context of the present examples, "hydrogen content" means the content of hydrogen atoms directly bonded to Si-atoms based on the total weight of the respective hydrosilicone compound.

The hydroxyl silicone resins used in the examples are as follows:

Z-6018 from Dow Corning, the weight-average molecular weight: 1500-2500, the content of hydroxyl group: 6.0 wt %;

806A from Dow Corning, the weight-average molecular weight: 200,000, the content of hydroxyl group: 1.0 wt %;

249 from Dow Corning, the weight-average molecular weight: 2000-4000, the content of hydroxyl group: 5.0 wt %;

220 from Dow Corning, the weight-average molecular weight: 2000-4000, the content of hydroxyl group: 1.0 wt %;

217 from Dow Corning, the weight-average molecular weight: 1,500-2,500, the content of hydroxyl group: 6.0 wt %;

KR220 L from ShinEtsu Chemical Co., the weight-average molecular weight: 2000-4000, the content of hydroxyl group: 4.0 wt %.

MK from Wacker Chemical Co., the weight-average molecular weight: 2000-4000, the content of hydroxyl group: 1.0 wt %.

Example 1

8.0 g 249, 6.0 g 7672, 6.0 g 7048, 79.8 g Ethyl acetate and 0.2 g triethylamine were weighed out and charged into a three-necked flask (molar ratio of SiH/SiOH is 6.5). After the mixture was heated to 70° C. and reacted at this temperature for 10 hours, ethyl acetate and triethylamine were removed via rotary evaporation, and thus a liquid hydrosilicone resin of the invention was obtained. The resulting hydrosilicone resin has a viscosity at 25° C. of 5,000 mPa·s, a weight-average molecular weight of 50,000, a hydrogen content of 8.1 mmol/g, and a light transmittance at 400 nm of 90%.

Example 2

5.0 g KR220L, 2.5 g 7672, 2.5 g 7048, 89.8 g Ethyl acetate and 0.2 g ammonium carbonate were weighed out and charged into a three-necked flask (molar ratio of SiH/SiOH is 5.4). After the mixture was heated to 60° C. and reacted at this temperature for 4 hours, ethyl acetate and ammonium carbonate were removed via rotary evaporation, and thus a liquid hydrosilicone resin of the invention was obtained. The resulting hydrosilicone resin has a viscosity at 25° C. of 2400 mPa·s, a weight-average molecular weight of 14,000, a hydrogen content of 5.5 mmol/g, and a light transmittance at 400 nm of 93%.

Example 3

6.0 g 249, 14.0 g HMS-301, 79.8 g Toluene and 0.2 g triethylamine were weighed out and charged into a three-necked flask (molar ratio of SiH/SiOH is 3.2). After the mixture was heated to 70° C. and reacted at this temperature for 20 hours, toluene and triethylamine were removed via rotary evaporation, and thus a liquid hydrosilicone resin of the invention was obtained. The resulting hydrosilicone resin has a viscosity at 25° C. of 12,000 mPa·s, a weight-average molecular weight of 120,000, a hydrogen content of 1.4 mmol/g, and a light transmittance at 400 nm of 91%.

Example 4

7.4 g KR220L, 3.7 g 7672, 3.7 g 7048, 85.2 g Ethyl acetate were weighed out and charged into a three-necked flask (molar ratio of SiH/SiOH is 5.3). Then purged with ammonia for 5 min. After the mixture was heated to 60° C. and reacted at this temperature for 5 hours, ethyl acetate and ammonia were removed via rotary evaporation, and thus a liquid hydrosilicone resin of the invention was obtained. The resulting hydrosilicone resin has a viscosity at 25° C. of 4,500 mPa·s, a weight-average molecular weight of 48,000, a hydrogen content of 5.7 mmol/g, and a light transmittance at 400 nm of 90%.

Example 5

4.0 g 249, 3.0 g 7672, 3.0 g 7048, 70.0 g Ethyl acetate and 0.2 g triethylamine were weighed out and charged into a three-necked flask (molar ratio of SiH/SiOH is 3.2). After the mixture was heated to 60° C. and reacted at this temperature for 8 hours, ethyl acetate and triethylamine were removed via rotary evaporation, and thus a liquid hydrosilicone resin of the invention was obtained. The resulting hydrosilicone resin has a viscosity at 25° C. of 1,100 mPa·s, a weight-average molecular weight of 11,000, a hydrogen content of 8.9 mmol/g, and a light transmittance at 400 nm of 92%.

Example 6

5.0 g KR220L, 2.5 g 7672, 2.5 g 7048, 89.8 g Ethyl acetate were weighed out, then purged with ammonia for 5 min and charged into a three-necked flask (molar ratio of SiH/SiOH is 5.4). After the mixture was heated to 60° C. and reacted at this temperature for 5 hours, ethyl acetate and ammonia were removed via rotary evaporation, and thus a liquid hydrosilicone resin of the invention was obtained. The resulting hydrosilicone resin has a viscosity at 25° C. of 2,300 mPa·s, a weight-average molecular weight of 21,000, a hydrogen content of 5.0 mmol/g, and a light transmittance at 400 nm of 94%.

Example 7

5.0 g 220, 2.5 g 7672, 2.5 g 7048, 89.8 g Ethyl acetate and 0.2 g triethylamine were weighed out and charged into a three-necked flask (molar ratio of SiH/SiOH is 21.2). After the mixture was heated to 60° C. and reacted at this temperature for 8 hours, ethyl acetate and triethylamine were removed via rotary evaporation, and thus a liquid hydrosilicone resin of the invention was obtained. The resulting hydrosilicone resin has a viscosity at 25° C. of 2,000 mPa·s, a weight-average molecular weight of 19,000, a hydrogen content of 7.6 mmol/g, and a light transmittance at 400 nm of 85%.

Example 8

5.0 g MK, 5.0 g 7672, 89.8 g Ethyl acetate and 0.2 g ammonium bicarbonate were weighed out and charged into a three-necked flask (molar ratio of SiH/SiOH is 15.3). After the mixture was heated to 60° C. and reacted at this temperature for 6 hours, ethyl acetate and ammonium bicarbonate were removed via rotary evaporation, and thus a liquid hydrosilicone resin of the invention was obtained. The resulting hydrosilicone resin has a viscosity at 25° C. of 1,100 mPa·s, a weight-average molecular weight of 15,000, a hydrogen content of 4.3 mmol/g, and a light transmittance at 400 nm of 94%.

Example 9

3.0 g 806A, 7.0 g 7672, 89.9 g Ethyl acetate and 0.1 g triethylamine were weighed out and charged into a three-necked flask (molar ratio of SiH/SiOH is 35.6). After the mixture was heated to 70° C. and reacted at this temperature for 4 hours, ethyl acetate and triethylamine were removed via rotary evaporation, and thus a liquid hydrosilicone resin of the invention was obtained. The resulting hydrosilicone resin has a viscosity at 25° C. of 20,000 mPa·s, a weight-average molecular weight of 250,000, a hydrogen content of 6.1 mmol/g, and a light transmittance at 400 nm of 86%.

Example 10

10.0 g Z-6018, 5.0 g F1-3546, 5.0 g 7048, 79.7 g Ethyl acetate and 0.3 g triethylamine were weighed out and charged into a three-necked flask (molar ratio of SiH/SiOH is 2.4). After the mixture was heated to 70° C. and reacted at this temperature for 16 hours, ethyl acetate and triethylamine were removed via rotary evaporation, and thus a liquid hydrosilicone resin of the invention was obtained. The resulting hydrosilicone resin has a viscosity at 25° C. of 15,000 mPa·s, a weight-average molecular weight of 50,000, a hydrogen content of 4.3 mmol/g, and a light transmittance at 400 nm of 92%.

Example 11

5.0 g 217, 5.0 g 202, 89.9 g Ethyl acetate and 0.1 g triethylamine were weighed out and charged into a three-necked flask (molar ratio of SiH/SiOH is 4.6). After the mixture was heated to 70° C. and reacted at this temperature for 10 hours, ethyl acetate and triethylamine were removed via rotary evaporation, and thus a liquid hydrosilicone resin of the invention was obtained. The resulting hydrosilicone resin has a viscosity at 25° C. of 2,000 mPa·s, a weight-average molecular weight of 13,000, a hydrogen content of 8.5 mmol/g, and a light transmittance at 400 nm of 90%.

What is claimed is:

1. A preparation process for a liquid hydrosilicone resin comprising:

dispersing at least one hydrosilicone oil, at least one hydroxyl silicone resin and at least one dehydrogenation catalyst in a solvent to form a dispersion, allowing the dispersion to react, and then removing the solvent and the catalyst, wherein the liquid hydrosilicone resin has an average compositional formula (I):

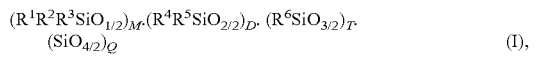
(R$^1$R$^2$R$^3$SiO$_{1/2}$)$_{M}$·(R$^4$R$^5$SiO$_{2/2}$)$_{D}$·(R$^6$SiO$_{3/2}$)$_{T}$·(SiO$_{4/2}$)$_{Q}$      (I), wherein R$^1$ to R$^6$ are identical or different radicals independently selected from the group consisting of organic groups and a hydrogen atom, with the proviso that at least one of R$^1$ to R$^6$ is a hydrogen atom bonded directly to a silicon atom, and M, T, and Q each represent a number ranging from 0 to less than 1, D represents a number larger than 0 and less than 1, M+D+T+Q=1, and T+Q>0, said liquid hydrosilicone resin having an average of at least two hydrogen atoms bonded directly to a silicon atom per molecule and a weight-average molecular weight of 10,000-300,000 g/mol; and wherein the hydrosilicone oil comprises a linear hydrosilicone oil of the following formula (II):

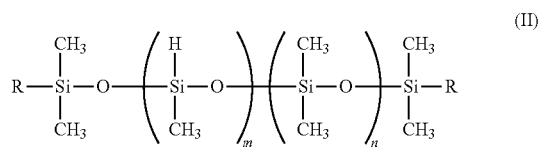

in which R is methyl or hydrogen, m>0, n≥0, the number of Si—H groups per molecule≥3, and the content of hydrogen atoms directly bonded to Si-atoms is 0.1-1.6 wt % based on the total weight of the hydrosilicone oil;

and/or a cyclic hydrosilicone oil of the following formula (III):

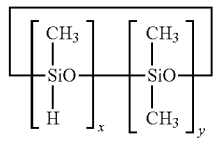

in which x>0, y≥0, the number of Si—H groups per molecule≥3, and the content of hydrogen atoms directly bonded to Si-atoms is 0.1-1.6 wt % based on the total weight of the hydrosilicone oil;

the hydroxyl silicone resin has an average compositional formula (IV):

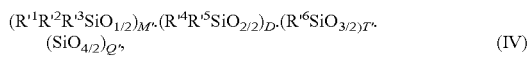
(R'$^1$R'$^2$R'$^3$SiO$_{1/2}$)$_{M'}$·(R'$^4$R'$^5$SiO$_{2/2}$)$_{D'}$·(R'$^6$SiO$_{3/2}$)$_{T'}$·(SiO$_{4/2}$)$_{Q'}$,      (IV)

in which R'$^1$ to R'$^6$ are identical or different radicals independently selected from the group consisting of organic groups and hydroxyl groups, and at least one of R'$^1$ to R'$^6$ is a hydroxyl group, M', D', T' and Q' each represent a number ranging from 0 to less than 1, M'+D'+T'+Q'=1, and T'+Q'>0, and the number of Si—OH groups per molecule of the hydroxyl silicone resin≥3;

provided that the molar ratio of the Si—H groups in the hydrosilicone oil to the Si—OH groups in the hydroxyl silicone resin is from more than 1.0 to 100.0.

2. The process according to claim 1, wherein the viscosity at 25° C. of the hydrosilicone oil is 5-1,000 mPa·s.

3. The process according to claim 2, wherein the viscosity at 25° C. of the hydrosilicone oil is 10-600 mPa·s.

4. The process according to claim 1, wherein the weight-average molecular weight of the hydrosilicone oil is 500-20,000 g/mol.

5. The process according to claim 4, wherein the weight-average molecular weight of the hydrosilicone oil is 1,000-17,000 g/mol.

6. The process according to claim 1, wherein the organic groups in the hydroxyl silicone resin are selected from the group consisting of linear or branched alkyls having 1-20 carbon atoms, alkenyls having 2-20 carbon atoms, cycloalkyls having 5-25 carbon atoms, cycloalkenyls having 5-25 carbon atoms, aryls having 6-30 carbon atoms, arylalkyls having 7-30 carbon atoms and halides thereof.

7. The process according to claim 1, wherein the organic groups in the hydroxyl silicone resin are selected from the group consisting of alkyls having 1-3 carbon atoms and phenyl.

8. The process according to claim 1, wherein the content of hydroxyl groups directly bonded to Si-atoms in the hydroxyl silicone resin is 0.1-20.0 wt %, based on the weight of the hydroxyl silicone resin.

9. The process according to claim 8, wherein the content of hydroxyl groups directly bonded to Si-atoms in the hydroxyl silicone resin is 1.0-10.0 wt % based on the weight of the hydroxyl silicone resin.

10. The process according to claim 1, wherein the weight-average molecular weight of the hydroxyl silicone resin is 600-250,000 g/mol.

11. The process according to claim 10, wherein the weight-average molecular weight of the hydroxyl silicone resin is 1,500 to 100,000 g/mol.

12. The process according to claim 1, wherein the total content of the hydrosilicone oil and the hydroxyl silicone resin is 2.0-60.0 wt % based on the total weight of the dispersion.

13. The process according to claim 1, wherein the dehydrogenation catalyst is one or more selected from the group consisting of bis(dimethylaminoethyl) ether, dimethylcyclohexylamine, N-methyldicyclohexylamine, pentamethyldiethylenetriamine, pentamethyldipropylenetriamine, tetramethylethanediamine, tetramethylethylpropylamine, tetramethylhexanediamine, N-methylmorpholine, N-ethylmorpholine, 2,2-bis(morpholino)diethyl ether, cocomorpholine, N-methylimidazole, 1,2-dimethylimidazole, 1,4-dimethylpiperazidine, ammonia, ammonium carbonate, ammonium bicarbonate, N,N-dimethylbenzylamine, tri(dimethylaminopropyl)amine and triethylamine.

14. The process according to claim 1, wherein the total content of dehydrogenation catalyst is 0.1-10.0 wt %, based on the total weight of the dispersion.

15. The process according to claim 14, wherein the total content of dehydrogenation catalyst is 0.1-5.0 wt % based on the total weight of the dispersion.

16. The process according to claim 1, wherein the solvent is one or more selected from the group consisting of ester, ketone, aliphatic hydrocarbon, aliphatic cyclic hydrocarbon, aromatic hydrocarbon and ether.

17. The process according to claim 16, wherein the solvent is one or more selected from the group consisting of acetone, butanone, methylisobutanone, cyclohexanone, toluene, xylene, methyl acetate, ethyl acetate, butyl acetate, diethyl ether, tetrachloromethane, petroleum ether and tetrahydrofuran.

18. The process according to claim 1, wherein the total content of solvent is 15.0-97.9 wt %, based on the total weight of the dispersion.

19. The process according to claim 18, wherein the total content of solvent is 30.0-90.0 wt % based on the total weight of the dispersion.

20. A liquid hydrosilicone resin produced according to the process of claim 1.

* * * * *